United States Patent [19]

Hamer et al.

[11] Patent Number: 4,594,636
[45] Date of Patent: Jun. 10, 1986

[54] REACTIVE LOAD DRIVE AND SURGE PROTECTION

[75] Inventors: Arthur Hamer, Oldham; Beverley H. Pardoe, Manchester, both of England

[73] Assignee: National Research Development Corporation, London, England

[21] Appl. No.: 534,242

[22] Filed: Sep. 21, 1983

[30] Foreign Application Priority Data

Sep. 21, 1982 [GB] United Kingdom ............... 8226867

[51] Int. Cl.$^4$ .......................................... H01H 47/32
[52] U.S. Cl. ..................... 361/152; 198/769; 318/128; 323/289; 363/56; 361/87; 361/190; 361/203
[58] Field of Search .............. 361/152, 154, 210, 226, 361/23, 31, 53, 135, 160, 203, 190, 87, 139; 323/289; 363/56; 198/769; 318/128, 129, 114, 126

[56] References Cited

U.S. PATENT DOCUMENTS

| | | | |
|---|---|---|---|
| 2,972,710 | 2/1961 | D'Amico | 361/152 |
| 3,372,793 | 3/1968 | Redford . | |
| 3,425,376 | 2/1969 | Brynge et al. | 318/128 X |
| 3,670,234 | 6/1972 | Joyce | 363/56 |
| 3,748,553 | 7/1973 | Reiner . | |
| 4,101,816 | 7/1978 | Shepter | 318/128 X |
| 4,142,684 | 3/1979 | Schweitzer | 361/152 X |
| 4,177,494 | 12/1979 | Tellert | 361/152 |
| 4,330,816 | 5/1982 | Imazeki et al. | 363/56 |
| 4,331,263 | 5/1982 | Brown | 198/769 X |
| 4,354,618 | 10/1982 | Weyandt . | |
| 4,390,812 | 6/1983 | Seidler | 323/289 |

FOREIGN PATENT DOCUMENTS

1219764 1/1971 United Kingdom ............... 198/769

OTHER PUBLICATIONS

"Linear IC of the Month", from *Electronics Industry*, Nov. 1982.

Primary Examiner—Michael L. Gellner
Attorney, Agent, or Firm—Cushman, Darby & Cushman

[57] ABSTRACT

An electrical drive circuit arrangement to control the energization of a reactive load with a high voltage including a control stage, an electrically isolating control signal transformer and an output stage including power control semiconductor devices and having an energization input for a high voltage electrical supply and an output for the connection of a reactive load, the high voltage being prevented from reaching the control stage via the input of the output stage by the isolating transformer, the control stage including a noise-resistant guard responsive to circuit condition signals to permit or prevent generation of the control signal, the transformer restricting the signal to the output stage to a permitted control signal and the output stage generating a protection signal on a current surge in a connected reactive load, the protection signal being a potential low enough for direct application to the control stage without the need for isolating transfer to protect against the high voltage reaching the control stage and the control stage responsive to the protection signal to act on the control signal and remove any energization of the load by the output stage and protect the stage.

9 Claims, 1 Drawing Figure

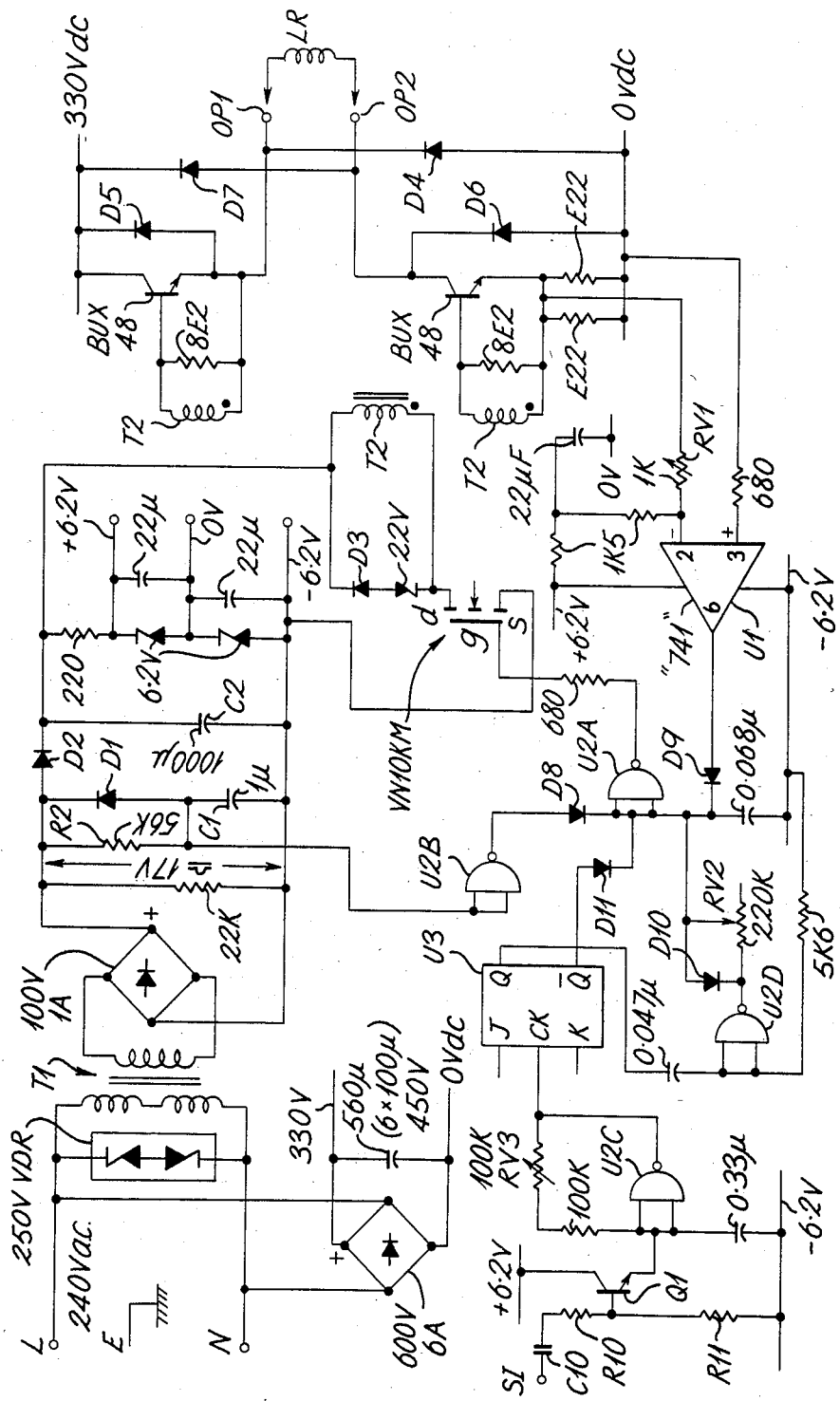

REACTIVE LOAD DRIVE AND SURGE PROTECTION

This invention relates to electrical drive circuits for reactive loads at power supply voltage and to the protection of the drive circuit against damage due to surge currents.

Reactive loads include the coils of actuators and the windings of motors. Smaller loads, rated at a few tens of watts, can be energised with low voltage (up to 50 v) through semiconductor control circuits without much difficulty. However when the voltage rises into the high or mains (network) power supply range, typically 220–250 volts or more, at tens or hundreds of Hertz, the problems of solid state control for reactive loads are much more severe. The margin of overload on the solid state devices is much less and the speed at which overheating can occur much greater than for the low voltage case. It is therefore necessary to provide greater protection against mis-operation, both accidental and deliberate. Specifically an actuator may be part of a vibratory conveyor. When the drive circuit includes semiconductor devices an electrical surge of very short duration can cause damage and ordinary protection, such as fuses or circuit breakers, is not always effective.

It is an object of the invention to provide an electrical drive circuit for reactive loads including protection against electrical surges, mis-operation and spurious operation.

According to the invention there is provided an electrical drive circuit arrangement to control the energisation of a reactive load with a high alternating voltage including a control stage to generate an alternating control signal and apply it to an output of the control stage, an electrically isolating control signal transfer means having an input connected to the output of the control stage to transfer the control signal to an output of the transfer means while isolating the output from the control stage, an output stage including power control semiconductor devices and having a control input connected to the output of the transfer means, an energisation input for a high voltage electrical supply and an output for the connection of a reactive load to which in operation the output stage applies said high voltage alternating energisation in dependence on the control signal, the high voltage being prevented from reaching the control stage via the input of the output stage by the isolating transfer means, the control stage further including means to provide circuit condition signals and a noise-resistant guard means responsive to said signals to permit generation of the control signal only when said condition signals have selected values, the transfer means further including means to restrict the signal to the input to the output stage to the control signal permitted by the guard means, and the output stage including means to generate a protection signal on the occurrence of a current surge in the high voltage energisation of a connected reactive load, the protection signal being constrained to a potential low enough for direct application to the control stage without the need for isolating transfer to protect against high voltage in the control stage and the control stage including means responsive to surge protection signal to act on the control signal and remove any energisation of the load by the output stage to protect the stage.

The transfer means may be a pulse transformer arranged to transfer a control signal of pulses to drive energisation current control semiconductor elements of the output stage into conduction for a controlled interval at a controlled repetition rate and the control stage means responsive to the protection signal may include a protection semiconductor device to interrupt the supply of a pulse through the transformer.

The pulse transformer may be arranged to provide the electrical isolation against the high voltage.

The pulse transformer may have a transformer primary input and a transformer secondary output and be arranged to apply a pulse supplied to the input at the output connected in a semiconductor device bias path to bias the device into conduction and the protection semiconductor device may act by interrupting the primary input.

The guard means may include the protection semiconductor device and a multi-input gate means to which gate the protection signal is applied as one input.

The protection signal may be a voltage developed across a low-value resistor in series with a connected reactive load by an excessive flow of current.

Typically the high voltage is in excess of 300 v and the load current is around ten amperes. The frequency of load energisation may be 10 Hz to 200 Hz. The protection signal may produce a response rate of 60 A/millisecond to at least 240 A/millisecond to provide very rapid removal of energisation, even during a half cycle of current.

Embodiments of the invention will now be described with reference to the accompanying drawing which is a circuit diagram of an arrangement to electrically energise a reactive load at a selected frequency in a range of frequencies and embodies the invention.

Referring to the drawing the power supply and output stages will be considered first. The output stage consists of two power transistors, type BUX48 for example, with associated power diodes D4 to D7. Terminals OP1, OP2 are provided for the connection of a load, especially a reactive one as exemplified at LR, in series with the power transistors across a d.c. supply of some 330 v rating. The power diodes are connected with polarities appropriate to provide a connection, of reverse polarity, between the load, LR, and the d.c. supply when the transistors are switched off after having energised the load. A conventional bridge rectifier capacitor smoothed power supply energised from the 240 v a.c. mains is shown. This power supply need not supply a particularly well-smoothed direct voltage but the regulation should not be too poor and a large capacitor is provided, nominally 560 micro Farad.

The power transistors, BUX48, are switched on and off together by a pulse arrangement including a pulse transformer T2 and a drive transistor type VN10KM. When the drive transistor is turned ON by a suitable drive pulse the pulse transformer supplies pulse voltages to base circuit of each power transistor to turn them ON for the duration of the drive pulse and current flows in a connected load such as LR. When the drive pulse ends the power transistors turn off and the load is connected, in reverse, by the diodes D4, D7. Diodes D5 and D6 are provided to suppress any "generator" emf which may arise when the load LR is a motor winding.

The control and excess current protection circuits will now be described. Integrated circuit U2 has four separate Schmitt NAND gates U2A–U2D and this integrated circuit provides a noise-resistant guard means as now described. The action of a Schmitt NAND gate requires the input voltage value to change from outside the threshold level to outside another threshold level through a small voltage difference between the thresholds, say 0.5 v to 3 V in integrated circuits, for the output condition to change. The NAND logic condition must also be met. In the present circuit the inputs of each gate are joined together so the logic condition does not apply. The voltage difference between the threshold provides a degree of protection against electrical "noise" causing spurious operation. Integrated circuit U3 is a J-K flip flop.

Considering gate U2C this is arranged to produce an oscillator by the charge and discharge of an input capacitor through a resistive feedback path from output to input. The resistance of the feedback path is adjustable by variable resistor RV3. For the present uses of the circuit frequencies in the range 10 Hz to 200 Hz are likely to be needed although only part of this range may be needed for any specific use.

The oscillator is arranged to run at twice the required frequency. The required frequency is obtained by dividing the oscillator frequency with a J-K flip flop, U3. This also ensures an equal mark/space ratio in the outputs available at Q and $\bar{Q}$. The $\bar{Q}$ output is used as explained below for a safety precaution. The Q output of integrated circuit U3 is differentiated by a capacitor-resistor network to provide a pulse input to gate U2D. This pulse, appearing at the output of gate U2D is of sufficient duration and appropriate polarity (i.e. a logic LOW, tending to $-6.2$ vdc) to discharge capacitor C6 via diode D10. Once discharged, and the pulse ended, capacitor C6 can be recharged from the now HIGH output of gate U2D via resistor RV2, which is variable to enable the time taken for capacitor C6 to charge to be chosen and varied. Capacitor C6 can only charge in this way if the outputs of integrated circuits U1, U3 and gate U2B are all logic LOW and thus isolated by diodes D9, D11 and D8 respectively.

While capacitor C6 is charging, subject to the above constraints, gate U2A provides a logic HIGH output to the gate of the field effect transistor type VN10KM. This transistor is therefore turned ON at the end of the discharge pulse from gate U2D and remains ON until the output of gate U2A changes to logic LOW. The turning ON of transistor VN10KM produces a pulse via transformer T2 to enable the power transistors to energise the reactive load LR, as described above. The duration of the drive pulse is thus set by the time taken for capacitor C6 to charge, set by variable resistor RV2, and the repetition rate of these pulses is half the frequency of the oscillator of gate U2C, set by variable resistor RV3. Resistors RV2, RV3 are "user" controls.

As so far described the circuit will energise a connected load with pulses of set length and repetition rate in the range of tens to hundreds of Hertz at a power level up to a few thousand watts (say 3KW).

However such an arrangement is not enough to give reliable operation and protection against overloads during service. In particular when current is switched into a reactive load in which current is decaying from a previous energisation the current flow can be very high in some conditions.

The circuit embodying the invention provides two stages of protection against this and other excess current conditions. Firstly the power supply arrangements for the pulse generator described above include protection against energisation of the output circuit in the absence of a supply to the pulse generator control circuits. In addition to the 330 vdc supply already mentioned there is a low voltage supply for the integrated circuits and pulse transformer drive circuit. A conventional bridge rectifier, supplied from the 240 vac mains via transformer T1, provides some 17 v of full-wave rectified voltage across resistor R2 and capacitor C1 in series. Through diode D2 this unregulated 17 v supply is applied to the primary of pulse transformer T2 and to drive transistor VN10KM and also to a series chain of two 6.2 volt zener diodes and a dropper resistor to produce a centre tapped $\pm 6.2$ vdc regulated supply for the integrated circuits U1, U2 and U3.

The availability of the low voltage supply is monitored by gate U2B. The input to this gate is from the junction of resistor R2 and capacitor C1 mentioned above. The potential at this point represents the average value of the full-wave rectified bridge output and is arranged, by choice of values of R2 and C1, to be enough to enable gate U2B to produce a logic LOW output when the 17 v supply is available. When the supply fails, or is switched off, capacitor C1 discharges rapidly through diode D1 and the 22 K shunt resistor to disable gate U2B and produce a logic HIGH output. This output is effective, via diode D8 which blocks the logic LOW, to charge capacitor C6 and apply an input to gate U2A to produce a logic LOW from the output of gate U2A. This terminates the pulse driving the transformer T2 and disables the output so no current can be supplied to the reactive load. In this way the correct operation of the protection circuit is monitored at switch-on and the output current is rapidly cut off when the protection supply is switched-off or fails.

A further safety precaution is provided by the connection from output $\bar{Q}$ of integrated circuit U3. The outputs Q and $\bar{Q}$ are of equal mark/space ratio and in antiphase. If the circuit associated with gate U2D attempts to enable gate U2A to beyond the half-cycle reversal of the required frequency the occurrence of the reversal of the $\bar{Q}$ output prevents this dangerous situation by disabling gate U2A with a logic HIGH through the diode D11.

The excess-current protection circuit is now described. In the output circuit a small-value resistance is provided to establish a potential difference which is a measure of the current in the output circuit. In the illustrated embodiment this resistance is about 0.1 ohm and is actually two 0.22 ohm resistors, in parallel, in the emitter circuit of the transistor connected to the 0v dc line. A small potential with respect to 0v dc is thus available as a current value signal. This signal is applied to one input (+) of a difference amplifier, integrated circuit U1. The other input (−) receives a reference value derived from a resistor chain across the +6.2 v supply. A variable resistor RV1 permits the pre-setting of the reference value. In operation if the potential difference, representing the actual current flow, exceeds the reference value the output of the differential amplifier U1 becomes logic HIGH and capacitor C6 is charged through diode D9 and any pulse drive to transformer T2 is cut-off disabling the output circuit as the current reaches a dangerous level.

To summarise, the protection arrangements ensure that any drive pulse is terminated when the supply to the protection arrangement fails, via gate U2B, or when excessive current flows in the output circuit, via differential amplifier U1, or when a drive pulse is too long.

The detector shown can operate with a high rate of change of current in the output circuit, values of 240A/msec at switch on and 60A/msec at the end of a pulse being achievable. Sensitivity to such high rates enables the current flow to be switched-off quickly enough to prevent damage to the output semiconductors due to excess current flow into a reactive load under a wide range of operating conditions and malfunctions, despite the time delay in the loop including U1, U2A, and the pulse drive and output circuits. Also the sensitivity is affected by the state of transformer T2, when for example it is saturated, and the hysteresis of the transformer.

To protect the pulse drive part of the circuit the primary of transformer T2 is shunted by a diode D3 in series with a 22v zener diode. This ensures that any excessive transients, due e.g. to leakage reactance, are controlled and do not damage the circuit elements. The resistors across the emitter-base junctions of the output circuit transistors assist in maintaining a high breakdown voltage for these divices.

The circuit diagram also shows an arrangement by which the oscillation providing the drive pulses can be synchronised with an external event such as a signal level transition. Input SI leads to capacitor C10 followed by series resistor R10 which together form a differentiator while resistor R10 with resistor R11 form a potential divider, the tapping point of which is connected to the base of transistor Q1. A pulse applied to input SI thus causes a voltage to occur on the emitter of transistor Q1 which is just above the maximum voltage needed to operate the Schmitt trigger gate of integrated circuit U2C and start an oscillator cycle. Suitable component values and types will be apparent for a particular application.

Use of input SI permits "closed-loop" operation of the drive circuit. Information about the movement or other parameter of the load LR can be provided, e.g. by a pick-up coil, and applied to input SI. For example if load LR is a drive coil for a vibratory conveyor the energisation of the coil can be controlled in a closed-loop.

The techniques described can be put into practice in other circuit forms, to achieve protection against current in-rush with reactive loads, and the above is only given by way of a example of an embodiment of the invention.

We claim:

1. An electrical drive circuit arrangement to control the energisation of a reactive load with a high alternating voltage including
   a control stage to generate an alternating control signal and apply it to an output of the control stage,
   an electrically isolating control signal transfer means having an input connected to the output of the control stage to transfer the control signal to an output of the transfer means while isolating the output from the control stage,
   an output stage including power control semiconductor devices and having a control input connected to the output of the transfer means, an energisation input for a high voltage electrical supply in excess of 300 volts d.c. and an output for the connection of a said reactive load to which in operation the output stage applies said high voltage alternating energisation in dependence on the control signal, the high voltage being prevented from reaching the control stage via the input of the output stage by the isolating transfer means,
   said control stage further including means to provide circuit condition signals and a noise-resistant guard means responsive to said signals to permit generation of the control signal only when said condition signals have selected values, the transfer means further including means to restrict the signal to the input to the output stage to the control signal permitted by the guard means, and the output stage including means to generate a protection signal on the occurrence of a current surge through said devices in the high voltage energisation of a connected reactive load, the protection signal being constrained to a potential low enough for direct application to the control stage without the need for isolating transfer to protect against high voltage in the control stage and the control state including means responsive to surge protection signal to act on the control signal and remove any energisation of the load by the output stage to protect the stage.

2. An arrangement according to claim 1 in which the control stage includes an oscillator to produce pulses of controllable duration and repetition rate and the guard means is responsive to condition signal values representing only the production by said oscillator of the correct form of the pulses to permit the generation of a control signal.

3. An arrangement according to claim 2 in which the oscillator includes means to produce a condition signal representing the duration of mark and space states, excess duration of one state ensuring that the generation of the control signal is not permitted.

4. An arrangement according to claim 1 in which the control signal is a train of pulses of adjustable repetition rate and duration to represent required energisation of a connected reactive load.

5. An arrangement according to claim 1 in which the electrically isolating transfer means is a pulse transformer including a primary winding and a secondary winding for each semiconductor device, in the form of a transistor, in the output stage the secondary winding being connected in a base circuit of the device to bring about controlled operation of the device by biassing the device into conduction with said pulse.

6. An arrangement according to claim 5 in which the control stage means responsive to the protection signal includes gate means responsive to said protection signal to interrupt the suppy of a pulse of the control signal to said pulse transformer thereby to remove energisation of the load even during a pulse of the control signal.

7. An arrangement according to claim 1 in which the noise-resistant guard means includes semiconductor switching devices with spaced operating thresholds to resist spurious operation by electrical noise.

8. An arrangement according to claim 7 in which the devices of the guard means are responsive to condition signals representing conditions including correct supply voltages for the circuit and correct form of the control signal to permit generation of the control signal.

9. An arrangement according to claim 1 in which the surge protection signal is generated in a low-value resistor in a current path through the output of the output stage.

* * * * *